May 31, 1932. J. H. SMITH 1,861,246
ADJUSTABLE TOOL HOLDER
Filed Sept. 30, 1929
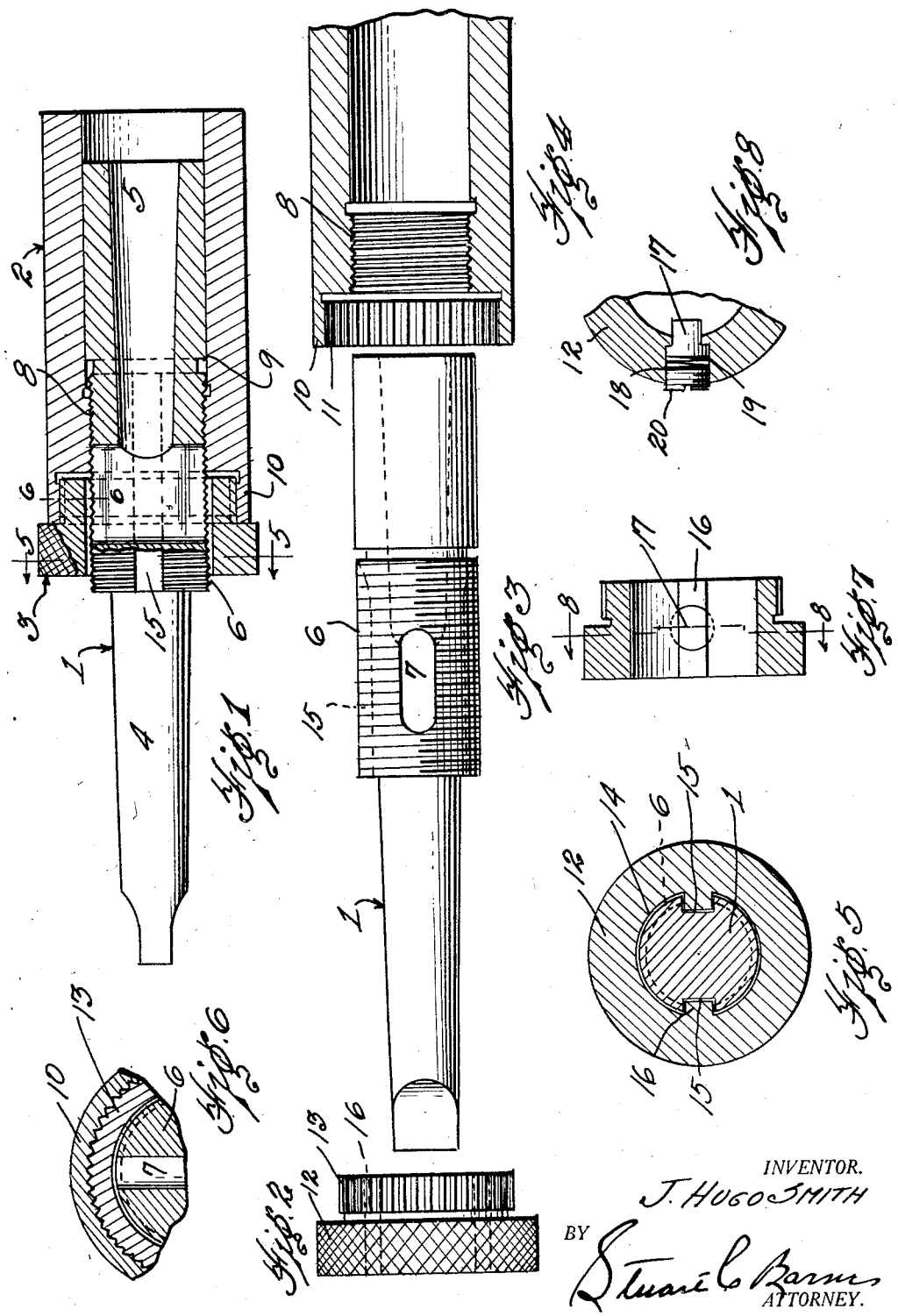
INVENTOR.
J. HUGO SMITH
BY
Stuart C. Barnes
ATTORNEY.

Patented May 31, 1932

1,861,246

UNITED STATES PATENT OFFICE

JOHN HUGO SMITH, OF DETROIT, MICHIGAN

ADJUSTABLE TOOL HOLDER

Application filed September 30, 1929. Serial No. 396,048.

This invention relates to an adjustable tool holder, and has to do particularly with tool holders having a stationary or driving member and a complemental member adapted to turn therewith but adjustable longitudinally relative thereto.

The present invention finds particular embodiment as an adjustable stop collar holder, although obviously it is not limited thereto, and the main gist of the invention resides in the provision of a very simple and inexpensive adjusting member which is not only very accurate but which positively eliminates the use of any locking nut or locking device of any kind.

More specifically, I have provided a main driving member and an auxiliary adjusting member adapted to be longitudinally adjusted relative to the first member but being threaded thereto, the position of one member relative to the other being determined by an adjusting member which freely slides on the threads of the driving member and which has a novel complemental engagement with the auxiliary member whereby the two members are driven as a unit. The complemental engagement between the adjusting member and the auxiliary member is such that an innumerable number of adjustments are provided so that the extent of adjustable movement between the two can be regulated so as to be almost imperceptible.

In the drawings:

Fig. 1 is a longitudinal sectional view of my tool holder and adjustable stop collar embodying the present invention.

Fig. 2 is a detail view of the adjusting member.

Fig. 3 is an elevation of the driving member of the tool.

Fig. 4 is a fragmentary detail view of the auxiliary adjustable member.

Fig. 5 is a sectional view taken on line 5—5 of Fig. 1, illustrating the manner of keying the adjusting member to the driving member.

Fig. 6 is a fragmentary sectional view taken on line 6—6 of Fig. 1.

Fig. 7 is a longitudinal sectional view of the adjusting member illustrating the manner of forming a part of the key as a spring pressed friction device.

Fig. 8 is a sectional view taken on line 8—8 of Fig. 7.

The principle of the present invention may be readily embodied in a wide number of different types of tool holders and such tool holders so embodying the invention may be used in connection with drills, reamers, counterbores, spot faces, etc. In illustrating the invention I have shown the same as embodied in a tool holder having an adjustable stop collar.

As best shown in Fig. 1, this tool holder and adjustable stop collar may consist of a main driving member 1, an auxiliary driven member 2, and a connecting or adjusting member 3 for controlling the relative movement between said driving and driven member. The member 1 in the particular embodiment illustrated consists of a standard shank 4 adapted to fit in the driving head of a particular machine, a tapered portion 5 for receiving the shank of the tool and a threaded portion 6.

As best shown in Fig. 3, the threaded portion 6 is provided with a standard aperture 7 for permitting insertion of a wedge for removal of the tool. This threaded portion 6 of the driving member is adapted to complementally engage with a threaded portion 8 formed in the driven member whereby one member may be adjusted longitudinally relative to the other. The member 1 is shown provided with a stop 9 whereby the two parts may be assembled from one direction only, but it will be understood that such arrangement is in no sense necessary.

The member 2 is illustrated as forming a simple stop member for the tool, but it will be understood that such auxiliary driven member 2 may take different forms such as forming the tool holder itself instead of the member 1. The upper or inner end of the member 2 is cut away to form an annular projecting flange 10 and the interior surface of this flange is serrated as at 11 to form a large number of teeth around such inner surface.

The connecting or adjusting member 3 consists of a head portion 12 which is serrated, and a second portion 13 which is also serrated in such a manner as to complementally fit the teeth formed by the serrated inner wall of the flange 10. As best shown in Figs. 5 and 7, the interior wall 14 of the member 3 is smooth and is designed to have a sliding fit over the threads 6 of the member 1. Suitable keyways 15 are longitudinally formed in the threaded portion 6 and suitable key members 16 are formed in the member 3 with the result that the member 3 will slide over the threads 6 but will turn therewith.

In case the tool holder is to be used in a horizontal position, I preferably make a portion 17 of the key 16 resilient. This portion 17, as best shown in Fig. 8 preferably comprises a plunger which fits within a suitable aperture 18 in the member 3 and which is backed by a suitable coil spring 19 held in position by an adjustable screw 20. It will thus be obvious that the portion 17 of the key 16 will thus provide sufficient friction to hold the member 3 in position when the unit is used in a substantially horizontal position.

It will be obvious that if the unit is assembled as shown in Fig. 1 that the auxiliary member 2 will rotate as a unit with the driving member 1 and thus maintain a fixed relation with respect thereto. To longitudinally adjust one member relative to the other it is only necessary to slide the member 3 up or away from the member 2 so that the teeth 13 thereof are disengaged from the teeth 11 formed in the flange 10. While so disengaged it will be apparent that the members 1 and 2 may be moved relatively due to screw thread engagement therebetween. Such relative movement may be limited to just the extent of one of the very small teeth so that the longitudinal movement will be almost imperceptible, or the movement may be quite extensive. Regardless of the relative longitudinal adjustment desired, the main point is that the tool is not limited to certain restricted points at which the adjustment must be made because the relatively large number of small teeth 11 and 13 makes it possible to stop and lock the adjustment wherever desired.

It will thus be obvious that I have not only provided a single easily operated adjustable member and thus eliminated all lock nuts, but have also provided adjusting means which permits of unusually fine and accurate adjustment.

What I claim is:

1. A tool holder of the class described, comprising a driving member, a driven member, threaded portions on each member adapted to interengage to effect a relative longitudinal adjustment between said members for a relatively great distance, and a connecting unit keyed to and longitudinally slidable directly over the threads of one member and adapted in one position to extend between said members and engage the other member for effecting unitary movement between said two members.

2. A tool holder of the class described, comprising a driving element and an auxiliary driven element, threaded portions on each element adapted to interengage to effect relative longitudinal adjustment between said two elements, a groove in one of said threaded portions, and a connecting unit slidable in said groove and adapted to engage said other element for locking the two elements together in predetermined adjusted relation, said connecting unit being held in engaging position by force of gravity.

3. A tool holder of the class described, comprising a driving element and an auxiliary driven element, threaded portions on each element adapted to interengage to effect relative longitudinal adjustment between said two elements, a groove in one of said threaded portions, and a connecting unit slidable in said groove and adapted to engage said other element for locking the two elements together in predetermined adjusted relation, said connecting unit for slidably engaging the threaded portion and also engaging the other member being the only means for locking said two members together, said connecting unit being held in locking position by force of gravity.

4. A tool holder of the class described, comprising a driving element, an auxiliary element rotatable relative to the driving element to effect relative longitudinal movement therebetween, and an axially movable connecting unit formed of one piece and having sliding keyed engagement with one of said members and adapted to slidably engage and lock the other of said members in a relatively large number of different positions whereby to accurately control the degree of longitudinal movement between said two members.

5. A tool holder of the class described comprising a driving element, an auxiliary element rotatable relative to the driving element to effect relative longitudinal movement therebetween, and an axially movable connecting unit formed of one piece and having sliding keyed engagement with said driving member and having means adapted to slidably engage and lock with means formed in the other of said members in a relatively large number of different positions whereby to accurately control the degree of longitudinal movement between said two members.

6. A tool holder of the class described, comprising a driving element, an auxiliary element, threaded portions on each element adapted to complementally engage to effect relative longitudinal movement by relative rotation in either direction between the two elements, a guideway formed in the threaded portion of one element, a relatively large number of serrations formed in the other element and a connecting member slidable in said guideway and having serrations for engaging the serrations in said other member whereby to permit locking of said two members together in any desired relative adjustment.

7. A tool holder of the class described, comprising a driving element, an auxiliary driven element, complementally engaging threaded portions on said two elements for effecting relative longitudinal adjustment in either direction between the two elements, one of said elements being provided with a large number of serrations and a connecting member slidably engaging said other element and having means adapted to complementally engage said serrations whereby to lock said two elements together in a relatively large number of positions.

8. A tool holder of the class described, comprising a driving element, an auxiliary driven element, complementally engaging threaded portions on said two elements for effecting relative longitudinal adjustment in either direction between the two elements, one of said elements being provided with a large number of serrations formed on a flange of relatively large diameter, and a connecting member keyed to and slidably engaging said other element and adapted to complementally engage said serrations whereby to lock said two elements together in a relatively large number of positions.

9. A tool holder of the class described, comprising a driving element, an auxiliary element, complementally engaging threaded portions on said two elements, one of said elements being provided with an annular axially extending flange of greater diameter than said threaded portions, the interior of said flange being provided with a relatively large number of axially extending serrations, and a connecting member slidably engaging one of said members and having a portion provided with axially extending serrations adapted to be moved into the space within said annular flange whereby to complementally engage the serrations on said flange and lock said two elements together in any one of a large number of positions.

10. A tool holder of the class described, comprising a driving member, an auxiliary member, complementally engaging threaded portions on said two members to effect relative longitudinal movement in either direction therebetween, a connecting unit keyed to and slidably engaging one of said members and having a serrated portion, and a similar serrated portion on the other member adapted to be complementally engaged by said serrated portion on said connecting unit whereby to lock said two members together.

11. A tool holder of the class described, comprising a driving element having a threaded portion, a hollow driven element having an internally threaded portion adapted to interengage with the said threaded portion of the said driving element to effect relative longitudinal adjustment between said elements, and an axially movable connecting unit having sliding keyed engagement with said driving element and adapted to slidably engage and lock with means formed in the other of said elements in a relatively large number of different positions whereby to accurately control the degree of longitudinal movement between the said two elements.

12. A tool holder of the class described, comprising a driving element having a threaded portion, a hollow driven element having an internally threaded portion adapted to interengage with the said threaded portion of the said driving element to effect relative longitudinal adjustment between said elements, said driving element being threaded into said driven element from one end only, and an axially movable connecting unit having sliding keyed engagement with said driving element, and adapted to slidably engage and lock with means formed in the other of said elements in a relatively large number of different positions whereby to accurately control the degree of longitudinal movement between the said two elements.

In testimony whereof I affix my signature.

JOHN HUGO SMITH.